United States Patent [19]

Nawata et al.

[11] Patent Number: 4,871,975
[45] Date of Patent: Oct. 3, 1989

[54] CARRIER RECOVERY CIRCUIT FOR OFFSET QPSK DEMODULATORS

[75] Inventors: Hizuru Nawata; Susumu Otani, both of Tokyo, Japan

[73] Assignee: NEC Corporation, Japan

[21] Appl. No.: 289,617

[22] Filed: Dec. 23, 1988

[30] Foreign Application Priority Data

Dec. 24, 1987 [JP] Japan ................. 62-328049

[51] Int. Cl.⁴ ............................................ H04L 27/22
[52] U.S. Cl. ...................................... 329/124; 331/12; 375/81; 375/82; 375/87
[58] Field of Search ................. 329/124; 331/12, 25; 375/81, 82, 83, 87; 455/260, 337

[56] References Cited

U.S. PATENT DOCUMENTS 4,704,582  11/1987  Dixon et al. .................. 329/124 X

*Primary Examiner*—Eugene R. Laroche
*Assistant Examiner*—Robert J. Pascal
*Attorney, Agent, or Firm*—Ostrolenk, Faber, Gerb & Soffen

[57] ABSTRACT

A carrier recovery circuit comprises a voltage-controlled oscillator with a $\pi/2$ phase shifter coupled to it for generating carriers of quadrature phase relationship. First and second phase comparators respectively detect phase differences between an offset QPSK modulated signal and the carriers of the quadrature phase relationship. Signal from the first phase comparator is delayed by a ½ symbol duration and applied to one input of a quadri-phase detector having stable phase angles at $\pi/4$, $(3/4)\pi$, $(5/4)\pi$ and $(7/4)\pi$ radian and signal from the second phase comparator is applied to the other input of the quadri-phase detector. A bit timing recovery field (1010 ... 1010) of the second channel is detected from the output of the second phase comparator. Signal from the quadri-phase detector is applied to a loop filter and thence to the voltage-controlled oscillator during the time when a bit timing recovery field (BTR) of the second channel is not still detected. To stabilize the operation of the carrier recovery loop of the circuit, the output of the second phase comparator from which that BTR is detected is briefly applied to the loop filter in response to the detection of a BTR of the second channel, instead of the signal from the quadri-phase detector.

5 Claims, 4 Drawing Sheets

CARRIER RECOVERY CIRCUIT FOR OFFSET QPSK DEMODULATORS

BACKGROUND OF THE INVENTION

The present invention relates generally to a carrier recovery circuit for an offset QPSK (quadrature phase shift keying) demodulator.

Offset QPSK is a form of QPSK in which the digits in the quadrature channels ahve a relative delay in their transitions. If the serial input data have symbol duration T, then the I and Q data will each have symbol duration 2TT. The relative delay between channels is T. In conventional QPSK the transitions are coincident. The purpose of this delay is to restrict the carrier phase transitions from having 180° phase transitions. When filtered, the offset QPSK will have less envelope fluctuation compared with QPSK. In the unfiltered case, the introduction of a delay has no performance effect and offset QPSK has the same error rate as does conventional QPSK. As is well known, signals are transmitted in the form of a succession of short-duration bursts in satellite communications system for minimizing satellite's power consumption and for enabling time division multiple access. In order to reduce demodulator signal acquisition time, bursts are structured so that each starts with a preamble containing bits that accentuate carrier clock frequency spectra. The preamble for each of the quadrature channels begins with a carrier recovery field which is followed by a clock recovery field. Specifically, the carrier recovery fields of both of the quadrature channels contain a succession of all binary 1's. Whereas the clock recovery field of in-phase channel contains a succession of all binary 1's as in the carrier recovery field and the clock recovery field of the quadrature channel contains a succession of alternating binary 1's and binary 0's. Since demodulators of satellite transmission systems operate at low carrier-to-noise (C/N) ratios and since the prable is of a short duration for channel utilizlation efficiency, it can occur that demodulators fail to successfully recover a carrier at the end of the carrier recovery field and hence the recovered carrier still contains a phase error at the beginning of the clock recovery field. This implies that carrier recovery action should continue after entering the clock recovery field. However, with conventtional carrier recovery circuits for offset QPSK demodulation, clock timing is not successfully recovered at the beginning of the clock recovery field. Even though a delay has been introduced in a Costas loop with a view toward coinciding phase transitions between in-phase and quadrature channels, it is impossible to continue to the carrier recovery process in the clock recovery field.

SUMMARY OF THE INVENTION

It is therefore an object of the present invention to provide a carrier recovery circuit for an offset QPSK demoulator which permits carrier recovery process to continue in a subsequent clock recovery field.

The signal received by the carrier recovery circuit an offset QPSK modulated signal having first and second channels of quadrature phase relationship. Each of said channels has a carrier recovery field and a bit timing recovery field (BTR), the carrier recovery field of each of said channels and the BTR of the first channel having a series of binary digits of identical logic values and the BTR of said second channel having a series of binary digits of alternating logic values.

According to the present invention, the carrier recovery circuit comprises a voltage-controlled oscillator with a $\pi/2$ phase shifter coupled to it for generating carriers of quadrature phase relationship, first and second phase comparators for detecting phase differences between the first and second channels of the offset QPSK modulated signal and the carriers of the quadrature phase relationship. Signal from one of these phase comparators is delayed by a $\frac{1}{2}$ symbol duration and applied to one input of a quadri-phase detector having stable phase angles at $\pi/4$, $(\frac{3}{4})\pi$, $(5/4)\pi$ and $(7/4)\pi$ radian and signal from the other phase comparator is applied to the other input of the quadri-phase detector. A bit timing recovery field (BTR) detector is connected to the second phase comparator for detecting a BTR of the second channel. Signal from the quadri-phase detector is applied to a loop filter and thence to the voltage-controlled oscillator when a BTR of the second channel is not detected by the BTR detector. In response to the detection of a BTR of the second channel, the output of the second phase comparator from which that BTR is detected is briefly switched to the loop filter, instead of the signal from the quadriphase detector.

This switching operation stabilizes the operation of a carrier recovering closed loop of the circuit against the effect of a phase error which occurs as a result of an unsuccessful recovery of carrier from a clock recovery field, allowing the carrier recovery process to continue in a succeeding clock recovery, or bit timing recovery field.

In a preferred embodiment, an envelope detector is connected to the outputs of the first and second comparators for detecting the carrier recovery field of at least one of the first and second channels. Initial phase error of a closed loop formed by the carrier recovery circuit with respect to a signal phase of the offset QPSK signal is estimated from the outputs of the first and second phase comparators. Frequency offset of the carriers is estimated from the initial phase error. A variable phase shifter is provided for introducing a constant phase shift of $(\pi/4)$ radian and a variable amount of phase shift equal to the estimated initial phase error to the carriers when a carrier recovery field is detected by the envelope detector. Signal from the second phase comparator is combined with the frequency offset and applied to the VCO as a frequency control signal when the carrier recovery field is not detected by the envelope detector. When the carrier recovery field is detected by the envelope detector, signal from the loop filter is combined with the frequency offset, instead of the signal from the second phase comparator, and applied to the VCO as the frequency control signal.

BRIEF DESCRIPTION OF THE DRAWINGS

The present invention will be described in further detail with reference to the accompanying drawings, in which.

DETAILED DESCRIPTION

Figure 1:
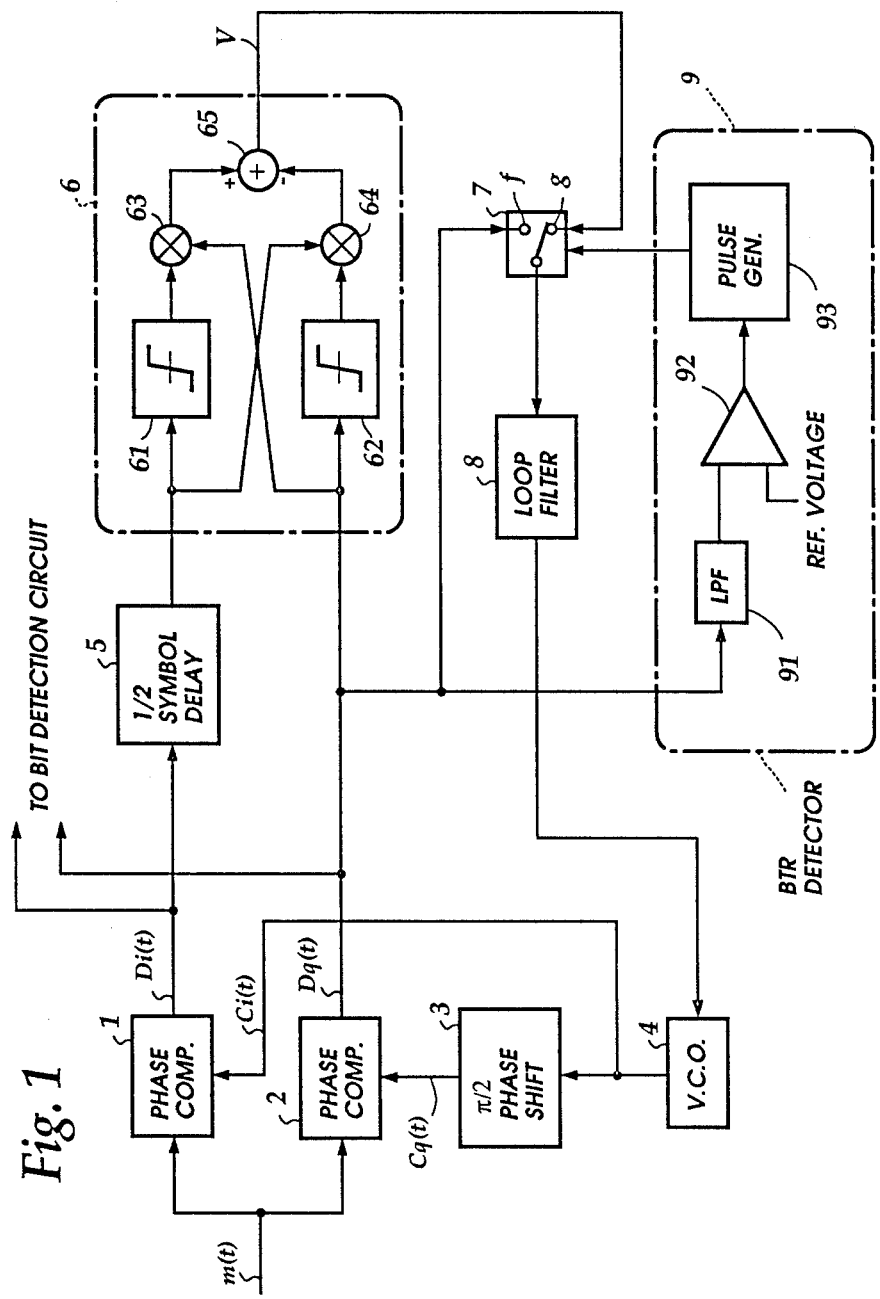
FIG. 1 is a block diagram of a carrier recovery circuit according to one embodiment of the present invention.

Referring now to FIG. 1, there is shown a carrier recovery circuit of an offset QPSK demodulator according to a preferred embodiment of this invention. An IF (intermediate frequency) offset QPSK input signal m(t), which contains an in-phase channel component I(t) and a quadrature channel component Q(t), is applied to an in-phase channel phase comparator 1 and a quadrature channel phase comparator 2, where the offset QPSK signal is represented as:

$$m(t) = \frac{1}{2} I(t)(e^{j\omega c t} + e^{-j\omega c t}) + \frac{1}{2j} Q(t)(e^{j\omega c t} + e^{-j\omega c t}) \quad (1)$$

Phase comparators 1 and 2 each multiply the input QPSK signal with quadrature versions $C_i(t)$ and $C_q(t)$ of a recovered carrier which are respectively supplied from the output of a voltage-controlled oscillator 4 via a switch 13 and the output of a $\pi/2$ phase shifter 3 which introduces a $\pi/2$ phase delay to the ouput of VCO 4. The output of phase comparator 1 is applied to a ½ symbol delay circuit 5 as a phase difference between the in-phase channel signal $D_i(t)$ and one of the carriers and thereafter to one input of a quadri-phase comparator 6 and the output of phase comparator 2 is applied to the other input of the quadri-phase detector 6 as a phase difference between the quadrature channel signal $D_q(t)$ and the other carrier. The outputs of phase comparators 1 and 2 are further applied to a bit detection circuit, not shown.

Since the recovered quadrature carriers can be represented by:

$$C_i(t) = e^{j(\omega c t + \theta)} + e^{-j(\omega c t + \theta)} \quad (2)$$

$$C_q(t) = \frac{1}{j} [e^{j(\omega c t + \theta)} + e^{-j(\omega c t + \theta)}] \quad (3)$$

where $\theta$ represents the phase error of the recovered carrier, the detected quadrature baseband signals are represented by:

$$\begin{aligned} D_i(t) &= m(t) \cdot C_i(t) \\ &= \frac{1}{2} I(t)[e^{j\theta} + e^{-j\theta}] + \frac{1}{2j} Q(t)[e^{-j\theta} - e^{j\theta}] \end{aligned} \quad (4)$$

$$\begin{aligned} D_q(t) &= m(t) \cdot C_q(t) \\ &= \frac{1}{2j} I(t)[e^{j\theta} - e^{-j\theta}] + \frac{1}{2} Q(t)[e^{j\theta} + e^{-j\theta}] \end{aligned} \quad (5)$$

Since the carrier and clock recovery fields of the I-channel signal contain all binary 1's, they can be represented by:

$$I(t) = 1 \quad (6)$$

Substituting it into Equations 4 and 5, the following relations hold:

$$D_i = \cos\theta - Q(t)\sin\theta \quad (7)$$

$$D_q = \sin\theta + Q(t)\cos\theta \quad (8)$$

The purpose of the ½ symbol delay circuit 5 is to coincide the phase transitions between the I and Q channels. The ½ symbol delay produces an output signal $\bar{D}q$ which is given by:

$$\bar{D}_q = D_q\left(t + \frac{T}{2}\right) = \sin\theta + Q\left(t + \frac{T}{2}\right)\cos\theta \quad (9)$$

The quadri-phase detector 6 is of a conventional design and includes a pair of data detectors 61 and 62 to which the I- and Q-channel signals are respectively applied, and a pair of multipliers 63 and 64 connected respectively to the outputs of data detectors 61 and 62. Each multiplier multiplies the output of associated data detector with the input of the data detector of the other channel. The outputs of multipliers 63 and 64 are substracted from each other by means of a substractor 65. As is well known, the quadri-phase detector 6 has four stable points, namely, $\pi/4$, $(\frac{3}{4})\pi$, $(5/4)\pi$ and $(7/4)\pi$ radian. Assume that the phase error $\theta$ is much smaller than unity, the outputs of the data detectors 61 and 62 are given as follows:

$$SGN(D_i) = SGN(\cos\theta) = 1 \quad (10)$$

$$\begin{aligned} SGN(\bar{D}_q) &= SGN\left(\sin\theta + Q\left(t + \frac{T}{2}\right)\cos\theta\right) \\ &= SGN\left(\sin\theta + Q\left(t + \frac{T}{2}\right)\right) \end{aligned} \quad (11)$$

where, SGN (·) denotes the signum function.

As a result, the output signal V of the quadri-phase detector 6 is given by the following Equation:

$$\begin{aligned} V &= SGN(D_i) \cdot \bar{D}_q - SGN(\bar{D}_q) \cdot D_I \\ &\approx \sin\theta + Q\left(t + \frac{T}{2}\right) - SGN\left(\sin\theta + Q\left(t + \frac{T}{2}\right)\right) \end{aligned} \quad (12)$$

The output of quadri-phase comparator 6 is applied to a position g of a switch 7 and thence ot a loop filter 8 whose output is supplied as a control signal to the VCO 4, completing a Costas loop. If clock timing is successfully established during the clock recovery field, then the relation $Q(t) = \pm 1$ holds. Hence the second and third terms of Equation 12 become eual to each other and the following relation holds:

$$V = \sin\theta \quad (13)$$

In this way, the phase error $\theta$ of the recovered carrier can be derived from the output of the quadri-phase detector 6. This implies that even though a carrier has not been successfully recovered at the beginning of the clock recovery field, a successful recovery of clock timing at the beginning of the clock recovery field allows the carrier recovery process to continue during the clock recovery field to complete a carrier recovery process.

In the prior art demodulator, however, the clock timing is not successfully recovered at the beginning of the clock recovery field and the second and third terms of Equation 12 may exist a phase error component. This phase error component of the output of quadri-phase detector 6 is passed through the loop filter 8 to the VCO 4 as a control signal, causing the prior art phase lock loop to go out of phase with the input signal. This is the reason why the use of a ½ symbol delay circuit in the prior art offset QPSK demodulator is not sufficient for successful carrier recovery.

According to the present invention, the switch 7 is provided for selectively coupling the Dq(t) output of the Q-channel phase comparator 2 and the output V of quadri-phase detector 6 to the loop filter 8, and a BTR (bit timing recovery field) detector 9 for detecting the bit timing recovery field of the Q-channel signal from the output of phase comparator 2. Switch 7 normally connects its contact arm to the contact position g in the absence of a control signal from the BTR detector 9 and switches its contact arm to the contact position f in response to that control signal.

Figure 2:
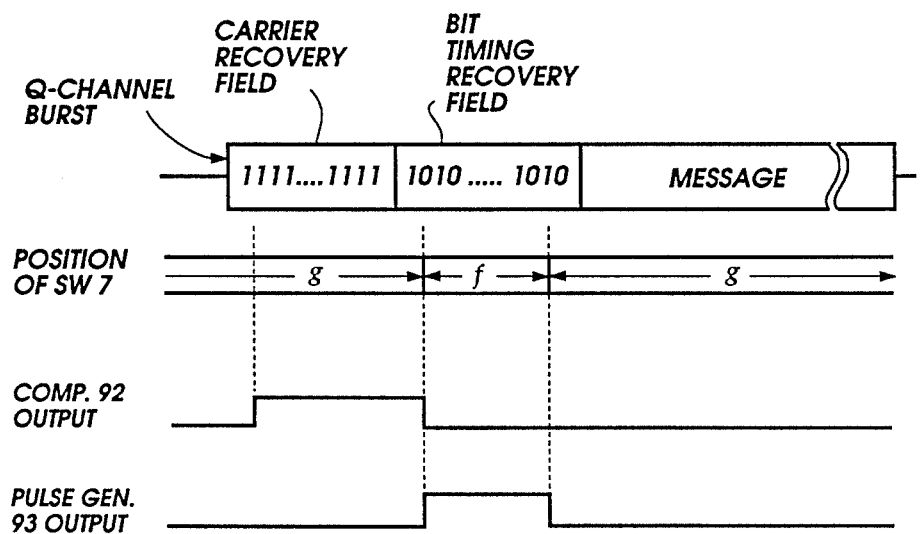
FIG. 2 is a timing diagram useful for describing the operation of the FIG. 1 embodiment.

BTR detector 9 comprises a low-pass filter 91 for filtering the output of phase comparator 2, a comparator 92 for comparing the filtered Q-channel signal with a reference voltage and a pulse generator 93. When a carrier recovery field of the Q-channel is detected by phase comparator 2, the low-pass filter 91 is charged by a series of all binary 1's of that carrier recovery field, developing a voltage which exceeds the reference voltage and producing a high level output from the comparator 92 as shown in FIG. 2. When the bit timing recovery field of the Q channel is subsequently arrived, the voltage at the output of low-pass filter 91 decreases below the reference voltage as it discharges its energy in response to the alternating binary 1's and 0's of the Q-channel bit timing recovery field. The output of comparator 92 switches to a low voltage level indicating the detection of a BTR and the pulse generator 93 supplies a control pulse to the switch 7 to briefly couple the output of Q-channel phase comparator 2 to the loop filter 8 instead of the output of quadri-phase detector 6.

As a result, the loop filter 8 now filters an alternating series of binary 1's and 0's when a bit timing recovery field of the Q-channel signal is detected by the BTR detector 9. This implies that the second erm of Equation 8 is nullified by the loop filter 8 and so its output reduces to a low level indicating a phase error of the recovered carrier. The control pulse applied to the switch 7 continues for a duration sufficient to reduce the phase error to zero.

Figure 3:
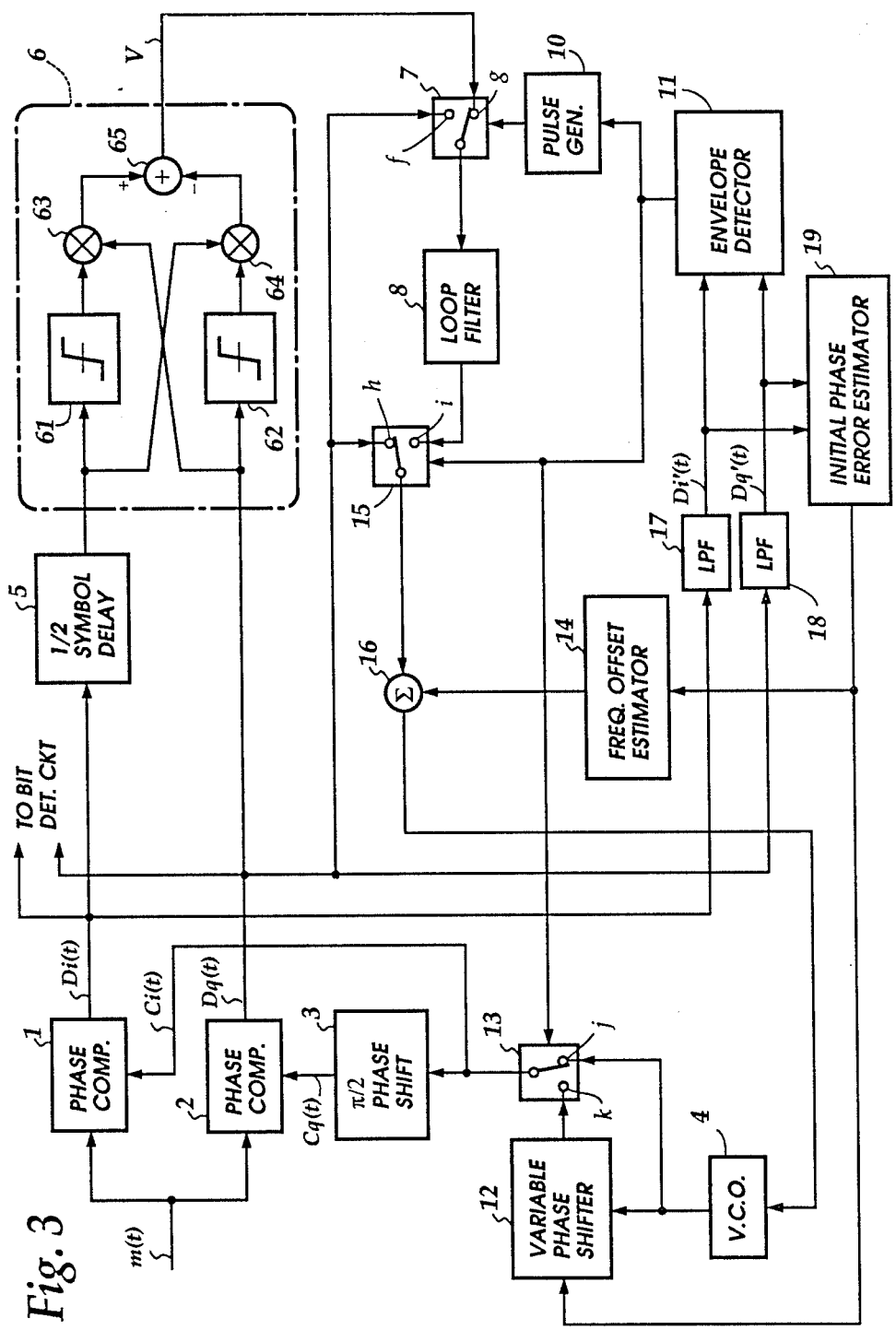
FIG. 3 is a block diagram of a carrier recovery circuit of a preferred embodiment.

A preferred form of the carrier recovery circuit is shown in FIG. 3. This embodiment comprises an envelope detector 11 which receives inputs from the I- and Q-channel phase comparators 1 and 2 by way of low-pass filters 17 and 18 and supplies an output to switches 13 and 15. A variable phase shifter 12 is provided, which is connected to the output of VC 4 to introduce a delay in accordance with the output of an initial phase error estimator 19. The output of variable phase shifter 12 is connected to the k contact position of switch 13. The output of VCO is also applied to the j contact position of switch 13, the contact arm of switch 13 being connected to phase comparator 1 and π/2 phase shifter 3. Initial phase error estimator 19 derives its inputs from low-pass filters 17 and 18 to generate a signal representative of an initial phase error $\theta_e$ which is generated in the recovered carrier at the beginning of carrier recovery fields of the I- and Q-channel signals due to frequency offset Δf of the carrier in the first order loop. The initial phase error estimtor 19 estimates the phase error $\theta_e$ by calculating Equation 14:

$$\theta_e = \tan^{-1}\{D_i(t)/D_q'(t)\} = 2\pi\Delta f/k \tag{14}$$

where k is the loop gian of the Costas loop pand $D_i'(t)$ and $D_q'(t)$ represent the outputs of low-pass filters 17 and 18, respectively, and are given as follows:

$$D_i'(t) = A \cos(2\pi\Delta f/k) \tag{15}$$

$$D_q'(t) = A \sin(2\pi\Delta f/k) \tag{16}$$

$$\Delta f = \frac{k}{2\pi} \theta_e \tag{17}$$

The output of phase error estimator 19 is also applied to a frequency offset estimator 14 which estimates the frequency offset Δf by calculating Equation 17 and dividing Δf by a factor equal to he gain $k_{vco}$ of VC 4 to derive a VCO control voltage $Vf = (k/k_{vco}2\pi)\theta_e$ for application to VCO 4 by way of an adder 16 to which the output of switch 15 is also applied.

Figure 4:
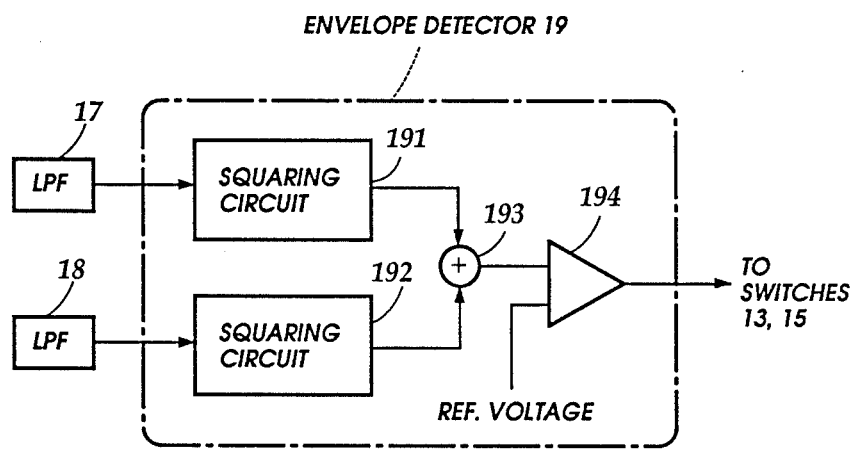
FIG. 4 is a circuit diagram of an envelope detector of FIG. 3.

As shown in FIG. 4, the envelope detector 11 comprises a pair of squaring circuits 191 and 192 connected respectively to low-pass filters 17 and 18. The outputs of squaring circuits 191 and 192 are summed by an adder 193 and applied to a comparator 194 for comparison with a reference voltage, the output of the comparator 194 being supplied to the switches 13 and 15.

Figure 5:
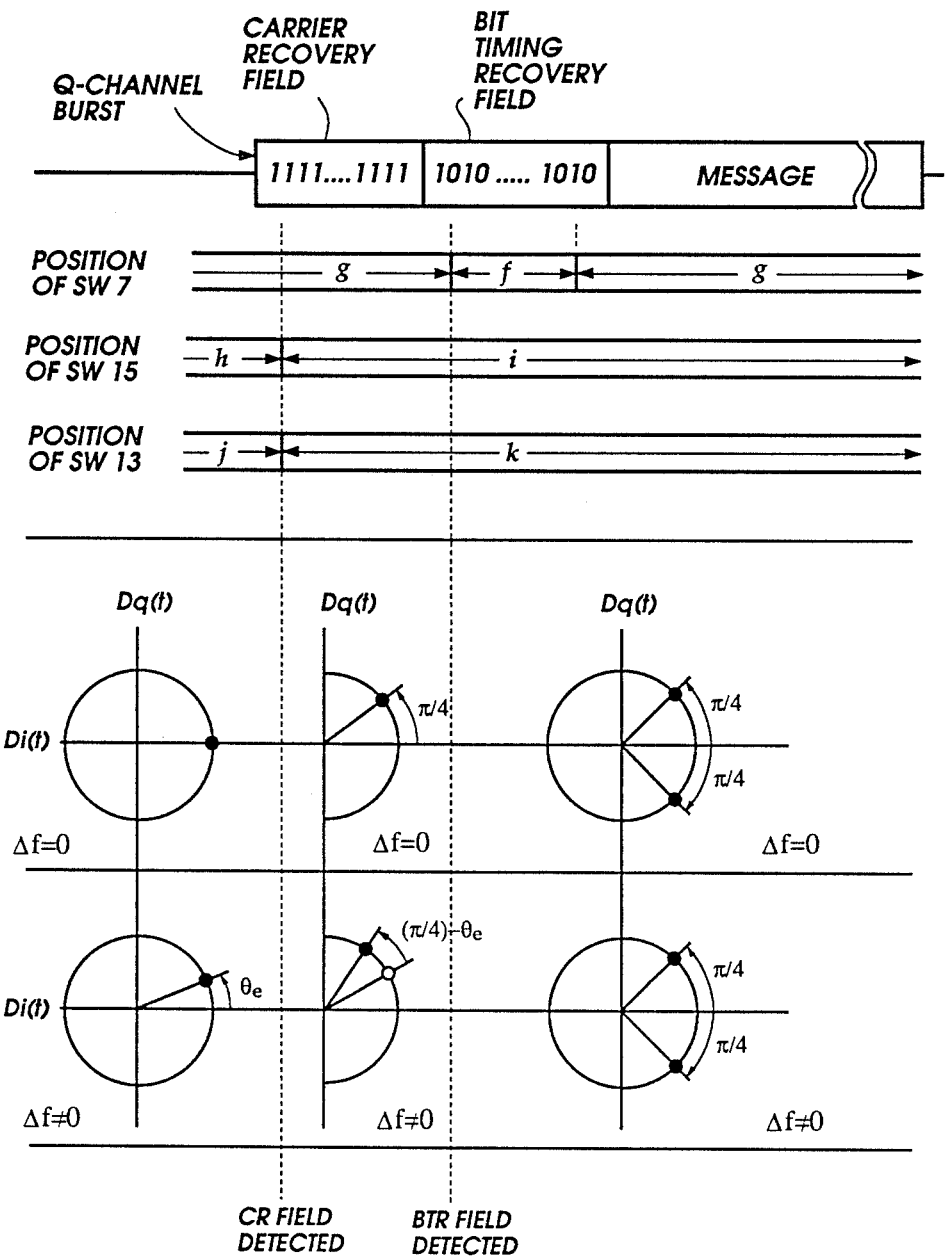
FIG. 5 is a timing diagram and scattering diagrams associated with the embodiment of FIG. 3.

The operation of the CR detector of FIG. 3 will be described with reference to FIG. 5. During the time prior to the reception of an offset QPSK signal, switches 7.13 and 15 are switched to their g, j and h contact positions, respectively, and the Costas loop operates in the mode of firstorder phase locked loop. On receiving the carrier recovery field of botch channels of the QPSK signal, the Costas loop is quickly phase locked in a manner characteristic of the first-order PLL. Because of all binary 1's of the carrier recovery fields, the squaring circuits 191, 192 of envelope estimator 19 both generate high level outputs and the sum of these outputs exceeds the reference voltage of comparator 194. Thus, switches 13 and 15 are moved to their k and i positions, respectively, coupling the output of loop filter 8 to the adder 16 and the output of variable phase shifter 12 to the phase comparators 1 and 2. A signal representative of the initial phase error $\theta_e$ is derived and supplied from the phase error extimator 19 to frequency offset estimator 14 which, in turn, derives a VCO control voltage Vf, which is applied through adder 16 to the VC 4. Variable phase shifter 12 is also supplied with the initial phase error to delay the phase of the VCO 4 output by an amount equal to $(4/\pi - \theta_e)$. When the switch 13 is moved to the i position, the quadri-phase detector 6 enters the quadri-phase mode, leaving the single-phase mode. Between these stable points here is a phase difference of π/4 radian. However, by virtue of variable phase shifter 12, this phase difference is compensated.

The lower part of FIG. 4 illustrates scattering diagrams in the cases of three successive modes having zero frequency eror and in the cases of correspondingn modes in which frequency error exists. It is seen that regardless of whether there is a frequency error or not, the phase difference of π/4 radian is compensated for when the switch 13 is moved to the i position. In the prsence of a frequency error Δf, the resulting initial phase error $\theta_e$ is compensated for by virtue of the frequency offset estimator 14.

Since the output of the envelope detector 11 corresponds to the output of comparator 92 of FIG. 1, it can be used as an input signal for a pulse generator 10 to generate a switching pulse of the switch 7. Subsequent to the detection of a CR field, the pulse generator 10 generates a pulse in the presence of a BTR field of the Q-channel signal to move the switch 7 to the f position for a brief interval, coupling the output of quadriphase detector 6 to the loop filter 8. The output of loop filter 8 is applied through switch 15 to adder 16 where it is summed with the output of frequency offset estimator 14 and applied to the VCO 4 as a frequency control signal.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A carrier recovery circuit for recovering a frequency reference for first and second channels of a received offset QPSK (quadrature phase shift keying) modulated signal, each of said channels having a carrier recovery field and a bit timing recovery field (BTR), the carrier recovery field of each of said channels and the BTR of said first channel having a series of binary digits of identical logic values and the BTR of said second channel having a series of binary digits of alternating logic values, comprising:

means including a voltage-controlled oscillator and a $\pi/2$ phase shifter coupled to the oscillator for generating carriers of quadrature phase relationship;

first and second phase comparators for respectively detecting phase differences between said first and second channels of said offset QPSK modulated signal and said carriers;

delay means for introducing a delay of ½ symbol duration to a signal from one of said first and second phase comparators;

quadri-phase detector means having stable phase angles at $\pi/4$, $(3/4)\pi$, $(5/4)\pi$ and $(7/4)\pi$ radian for receiving a signal from said delay means and a signal from said second phase comparator;

BTR detector means connected to said second phase comparator for detecting the BTR of said second channel and generating a pulse upon the detection of said BTR;

selecting means for selecting a signal from said quadri-phase detector means in the absence of said pulse and briefly selecting a signal from said second phase comparator in the presence of said pulse; and a loop filter for filtering the signal selected by said selecting means and supplying the filtered signal to said voltage-controlled oscillator as a frequency control signal.

2. A carrier recovery circuit as claimed in claim 1, further comprising:

envelope detector means connected to the outputs of said firsta nd second comparators for detecting the carrier recovery field of at least one of said first and second channels;

initial phase error estimator means connected to said first and second phase comparators for estimating an initial phase error of a closed loop formed bys aid carrier recovery circuit with respect to a signal phase of said offset QPSK signal;

frequency error estimator means for deriving from the estimated initial phase error a signal representative of a frequency offset of said carriers with respect to a frequency of said QPSK signal;

variable phase shifting means for introducing a constant phase shift of $(\pi/4)$ radian and a variable amount of phase shift equal to the estimated initial phase error to said carriers in response to the detection of a carrier recovery field by said envelope detector means;

second selecting means for selecting a signal from said second phase comparator when said carrier recovery field is not detected by said envelope detector means and selecting a signal from said loop filter when said carrier recovery field is detected by said envelope detector means; and means for combining the signal selected by said second selecting means with said frequency offset representative signal and supplying the combined signals to said voltage-controlled oscillator as said frequency control signal.

3. A carrier recovery circuit as claimed in claim 1, wherein said BTR detector means comprises a low-pass filter for filtering a signal from said second phase comparator, a comparator for generating a signal when a signal filtered by said low-pass filter decreases below a predetermined level, and means for generating said pulse in response to a trailing edge of said signal from said comparator and applying said pulse to said selecting means as an indication of the detection of said BTR.

4. A carrier recovery circuit as claimed in claim 3, wherein said BTR detector means further comprises a squaring circuit for squaring the signal filtered by said low-pass filter and applying the squared signal to said comparator for comparison with said predetermined level.

5. A carrier recovery circuit as claimed in claim 2, wherein said initial phase error is represented by $2\pi\Delta f/k$, where k represents a loop gain of said closed loop and $\Delta f$ represents the amount of said frequency offset, and wherein said initial phase error estimator means includes low-pass filters for filtering signals from said first and second phase comparators and calculates $\tan^{-1}\alpha/\beta$, where $\alpha$ and $\beta$ represent respectively the signals filtered by said low-pass filters.

* * * * *